United States Patent [19]

Rosenblatt

[11] Patent Number: 5,157,537
[45] Date of Patent: Oct. 20, 1992

[54] DISTRIBUTED RESONANT CAVITY LIGHT BEAM MODULATOR

[75] Inventor: David Rosenblatt, Rehovot, Israel

[73] Assignee: Yeda Research and Development Co., Ltd., Rehovot, Israel

[21] Appl. No.: 650,559

[22] Filed: Feb. 1, 1991

[51] Int. Cl.⁵ .................. G02F 1/07; G02F 1/035; G02B 27/44; G02B 1/10

[52] U.S. Cl. .................. 359/245; 359/248; 359/586; 359/563; 359/589; 385/3; 385/37; 372/96

[58] Field of Search .......... 350/353, 355, 96.13, 350/385, 386, 389, 162.17, 162.19, 162.2; 359/245, 248, 251, 260, 263, 320, 321, 563, 568, 571, 578, 579, 584, 585, 586, 587, 589; 357/23.1; 385/2, 3, 10, 37; 372/96, 102, 18-20

[56] References Cited

U.S. PATENT DOCUMENTS

| | | | |
|---|---|---|---|
| 3,674,336 | 7/1972 | Kogelnik | 350/162.2 |
| 3,891,302 | 6/1975 | Dabby et al. | 385/37 |
| 3,951,513 | 4/1976 | Masi | 350/96.14 |
| 3,970,958 | 7/1976 | Streifer et al. | 350/96.19 |
| 4,006,963 | 2/1977 | Baves et al. | 350/96.19 |
| 4,227,769 | 10/1980 | Phillips et al. | 359/571 |
| 4,531,809 | 7/1985 | Carter et al. | 385/37 |
| 4,583,818 | 4/1986 | Chen et al. | 350/96.19 |
| 4,750,801 | 6/1988 | Alferness | 385/37 |
| 4,790,634 | 12/1988 | Miller et al. | 359/260 |
| 4,796,274 | 1/1989 | Akiba et al. | 350/96.14 |
| 4,835,779 | 5/1989 | Liou | 372/96 |
| 4,873,691 | 10/1989 | Uomi et al. | 372/96 |
| 5,016,990 | 5/1991 | Dobson | 359/260 |
| 5,043,991 | 8/1991 | Bradley | 372/96 |
| 5,091,983 | 2/1992 | Lukosz | 385/10 |

FOREIGN PATENT DOCUMENTS

| | | | |
|---|---|---|---|
| 0169818 | 7/1986 | Japan | 359/571 |
| 0200131 | 8/1988 | Japan | 359/248 |
| 0101513 | 4/1989 | Japan | 359/568 |

*Primary Examiner*—Eugene R. LaRoche
*Assistant Examiner*—Evelyn A. Lester
*Attorney, Agent, or Firm*—Fleit, Jacobson, Cohn, Price, Holman & Stern

[57] ABSTRACT

An optical apparatus consisting of a laser for producing a coherent polarized beam of electromagnetic radiation of a preselected wavelength. A substrate of silicon has a first transparent cover layer for receiving the polarized beam substantially normally incident thereto, an a second transparent guide layer for receiving the polarized beam from said first layer and for supporting at least one resonant mode. The first and second layers have a preselected index of refraction and a grating is interposed between them, having a grating period less than half the preselected wavelength. The layers and grating interact to produce a standing wave resonance by Bragg reflection. A control obtains a resonance wavelength in the guide layer equal to the predetermined radiation wavelength and thereby high reflectance to modulate the polarized beam.

20 Claims, 18 Drawing Sheets

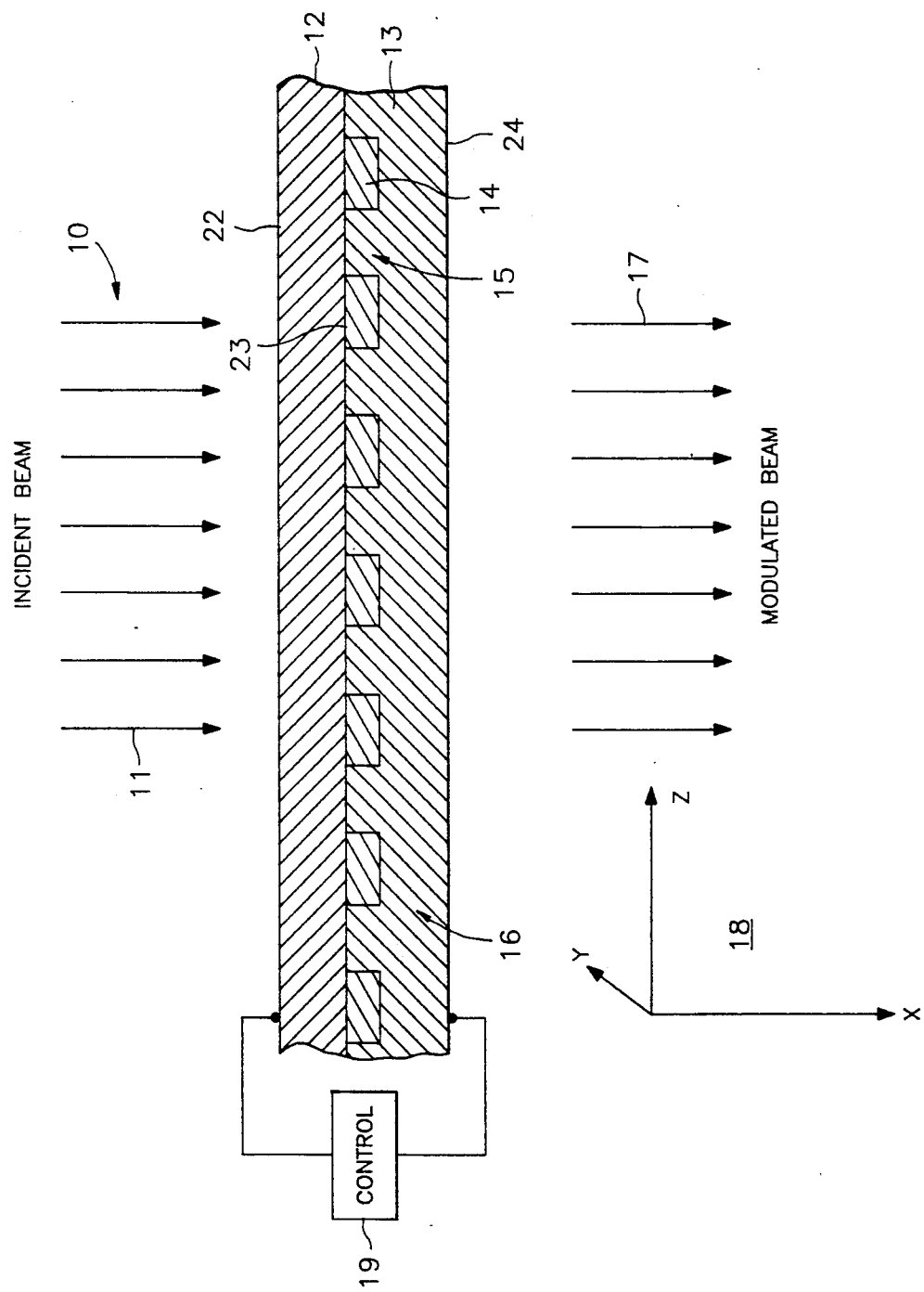

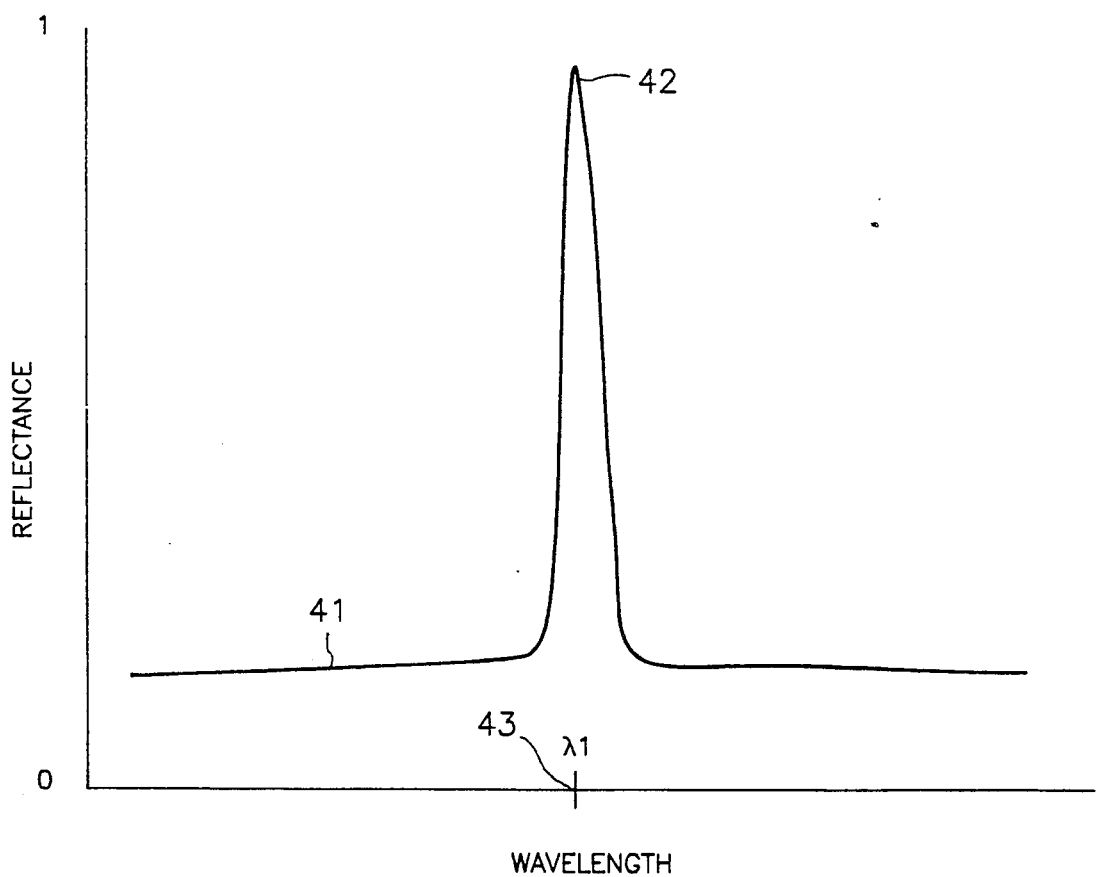

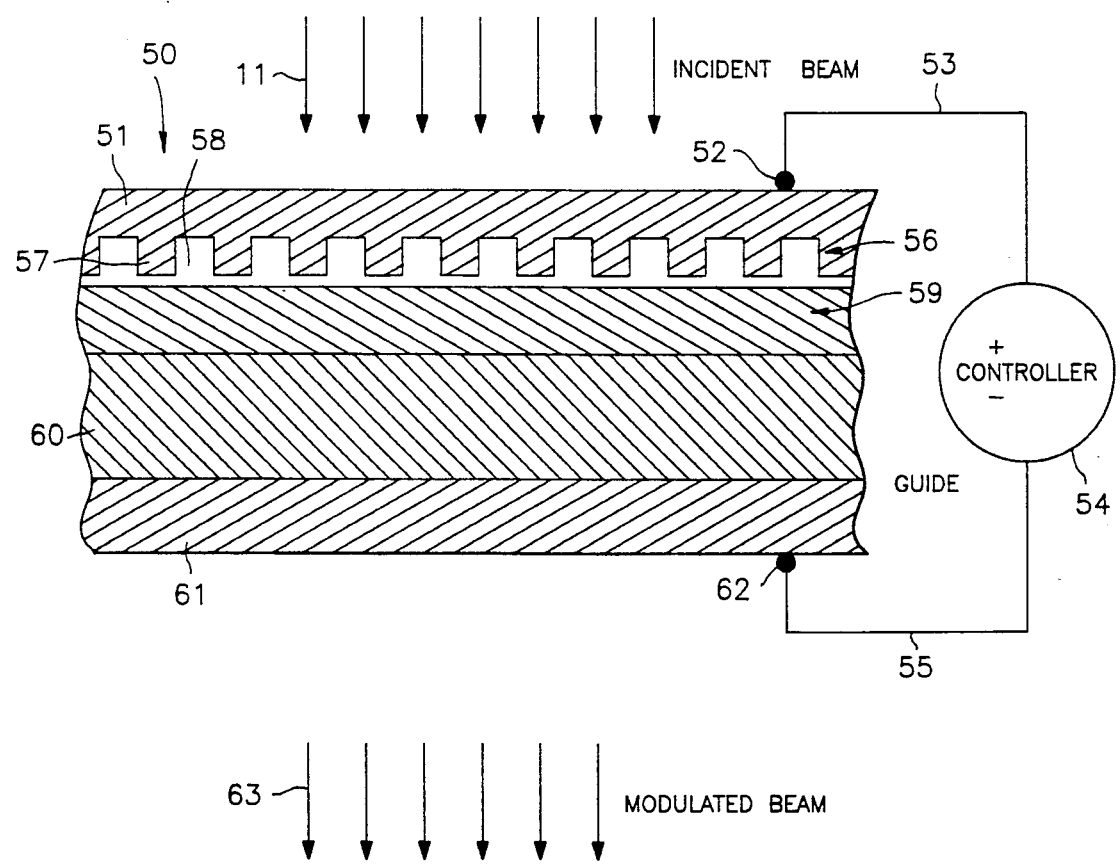

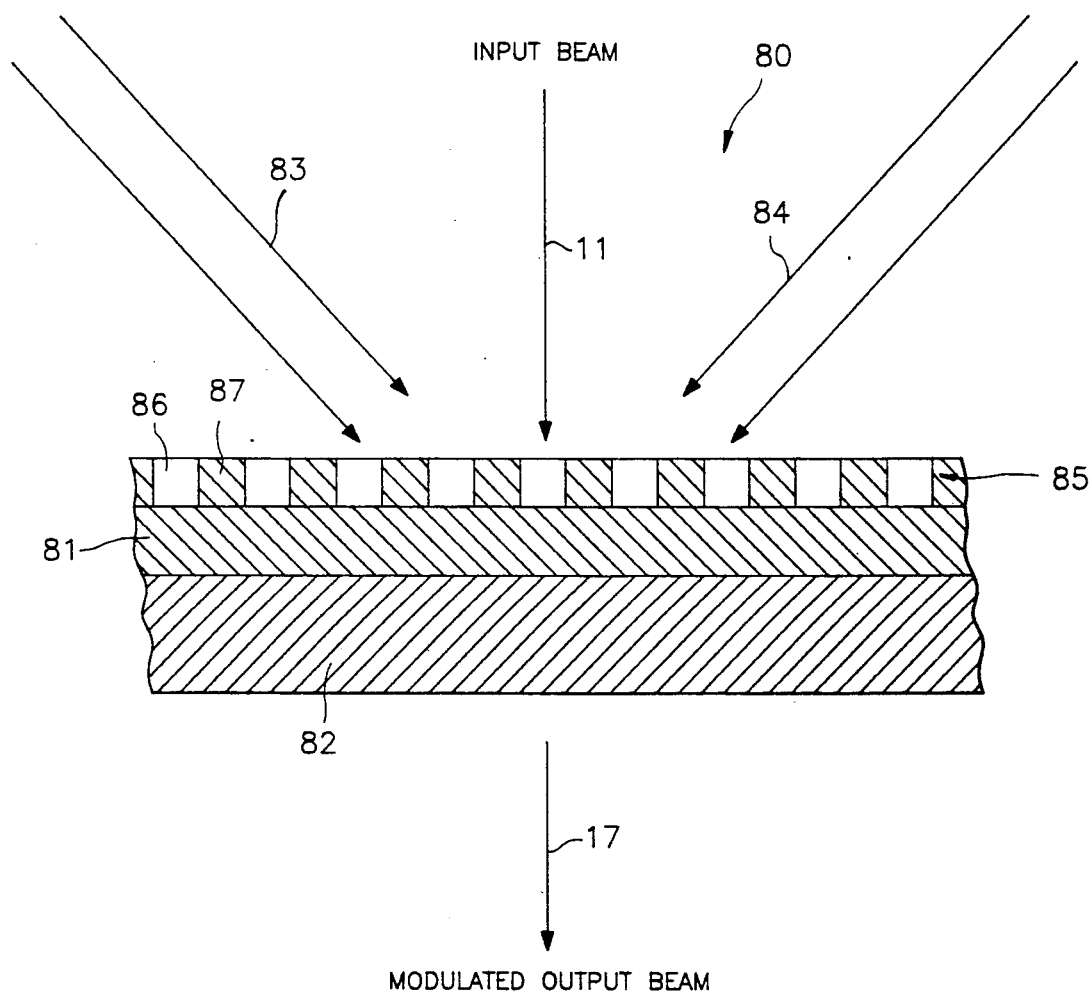

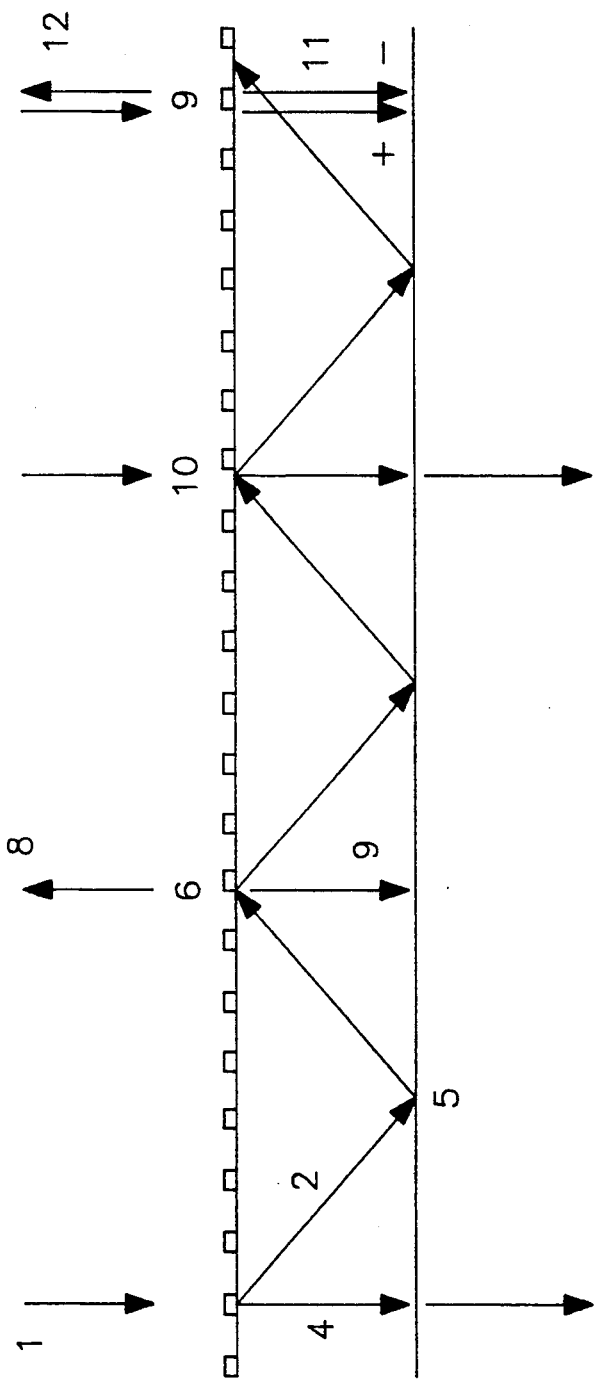

DISTRIBUTED RESONANT CAVITY LIGHT BEAM MODULATOR

FIELD OF THE INVENTION

The invention relates to optical devices for the modulation of light beams by the control of light transmission, and in particular to an optical device which blocks light transmission by resonance reflection when the light frequency is substantially equal to the device resonance frequency and which otherwise freely transmits incident light when the device resonance frequency and the light frequency differ.

BACKGROUND OF THE INVENTION

The advantageous use of light, the visible electromagnetic radiation, as the signal medium in communications and in computer systems is well recognized. Of particular importance is coherent light such as that produced by lasers because of propagation characteristics and bandwidth. Modulation of a laser beam is a rapid and efficient means of information transmission.

Various devices for modulation of a light beam are currently in use. These include semiconductor devices utilizing quantum wells fabricated by molecular beam epitaxy in 3-5 compounds and other switching devices 3-5 compound, quantum well devices have excellent switching characteristics, but their manufacture involves complicated and expensive technologies. There exists a need for a light modulator which is simple in construction and inexpensive which can readily be fabricated in the form of a 2-dimensional array, and, at the same time, which is capable of switching light on and off at gigahertz rate, a rate much larger than that for most conventional devices.

A review of the prior art reveals one device which involves a grating, namely, a surface emitting distributed feedback laser which uses a grating to support the necessary feedback for laser operation. See G. E. Evans, N. W. Carlson, J. M. Hammer, R. A. Bartolini, Laser Focus World, November 1988, p.97; and W. Streifer, D. R. Seifres, R. D. Burnham, IEEE J. Quantum Electronics, Vol. QE-12, No. 7, July 1976. In contrast, the present invention provides for the modulation and control of a beam produced by a laser.

SUMMARY OF THE INVENTION

The instant invention is an optical device for the modulation of light transmission through the device by coupling or decoupling the radiation with a resonant mode of the device. For an incident wavelength or frequency equal to the respective resonant wavelength or frequency of the invention, the incident radiation is dominated by resonant reflection and transmission through the apparatus is precluded. For all other values of incident wavelength or frequency, the device is substantially transparent.

In accordance with the present invention, the resonant wavelength strongly depends upon the geometry of the comprising components, the composition of the components, the electrical environment as imposed by external sources of electromotive force (EMF) and the incident radiation. Control by externally applied EMF or radiation is exceptionally fast.

The simplest embodiment of the present invention comprises a first transparent cover layer to which the incident beam is directed perpendicular to the layer; a second layer which is a grating structure of alternate bars of different index of refraction disposed under the cover layer and a third transparent resonant guide layer encapsulating the grating and providing the guide channel for Bragg diffraction in a direction perpendicular to both the grating bars and the incident radiation beam.

The support for the layers comes from the substrate on which they are grown or deposited. Some of the embodiments have the grating bars or teeth exposed to air. Some of the embodiments have electrical contacts through a transparent cover electrode, so a generic cover layer is reasonable. Including a cover layer also enables covering the device with multilayer antireflection coatings, which would improve device performance.

The grating bars have different indices of refraction. There are no opaque regions. This produces more efficient diffraction. Typically, the grating grooves are etched into the guide layer, although a separate grating layer with bars made from a different material than the guide layer can be used. Some embodiments can use the grating layer as the guiding layer as well.

First order coupling of the incident radiation to the grating produces radiation propagating predominantly in the guide layer perpendicular to both the incident beam and the grating bars. Bragg reflection by second order coupling to the grating produces oppositely directed waves which superimpose on the diffracted first order waves to produce a standing wave resonance in the guide layer. Since the resonance in the guide layer depends on the grating geometry and on the optical properties of the guide layer, but not on the lateral dimensions of the guide layer perpendicular to the incident beam, the resonance is distributed along the guide layer.

The guide layer has a higher index of refraction than the adjacent layers for the devices which are based on dielectric waveguides, or is a metal, with a complex index of refraction for surface plasmon based devices. Electromagnetic wave (guided mode) is guided by this part of the structure, but is not entirely contained within it. The wave especially must penetrate into the grating layer for the coupling processes to occur. Bragg diffraction is caused by the periodicity in the grating layer.

The radiation energy of the distributed resonance in the guide layer is diffracted back through the grating and forms a wave propagating in the opposite direction to the incident wave. At resonance, energy from the incident wave is first converted to distributed resonance energy, and second converted to energy in a wave propagating back along the path of the incident wave. Transmission of the radiation through the device is blocked by resonance reflection. As taught by this invention, the incident beam is modulated by controlling the conditions which establish or extinguish a distributed resonance in the guide layer.

Only a portion of the incident radiation is coupled into the cavity. The rest passes through. Because of the resonance effect this energy is stored and accumulates to a level that is larger than the incident beam power. The cavity then emits radiation in the same magnitude but, out of phase with the portion that passes through, which cancels it. The cavity also emits energy in the opposite direction which is the reflected wave.

The energy in the guide distributed resonance determines the reflectivity of the incident wave and thereby determines the transmission of the incident wave through the device. Modulation of the incident radiation beam is determined by the presence or absence of resonance in the distributed resonant cavity.

The requirement for first order coupling by the grating is that the grating period be typically less than a wavelength of the incident radiation. This prevents the loss of resonant energy to higher diffracted orders radiated by the grating.

Using a period less than the wavelength ensures that there are no propagating diffracted orders that radiate at angles other than the normal angle out of the structure. This prevents unwanted energy loss out of the system.

The thickness is dictated by the fact that only one guided mode should be supported by the structure. This prevents another route for unwanted energy loss by coupling to the additional modes (by defects for example). Typically, for one mode it works out that the thickness is on the order of a wavelength. So that only one guided mode is supported and resonant energy is not lost by coupling to additional guide modes. Typically the thickness of the guiding film or layer for the distributed resonance is on the order of one wavelength.

By defining a Cartesian coordinate system x, y and z for reference, a beam polarized radiation with electric field along the y-axis (TE polarization) propagates along the x-axis and is normally incident on one side of a first transparent cover layer in the y-z plane. The second element is a grating disposed on the transparent support layer on the side opposite the incoming light, said grating having bars and grooves along the y-axis. The third element is a transparent guide layer imbedding the grating bars and in contact with the first layer in the grating grooves. First order diffracted radiation propagates primarily in the guide layer along the z-axis. Coupling of the normally incident radiation of wavelength $\lambda$ to the guided mode is characterized by propagation constant $\beta = mK$, where m is equal to 1 for first order and K is equal to the $2\pi/\Lambda$ where $\Lambda$ is the grating period. The radiation propagating with constant $\beta$ along the z-axis is Bragg reflected by the grating. The value for $\beta$ for which a standing wave or resonance exists is given by $$\beta_{forward} - \beta_{reverse} = 2\beta = mK$$

For second order, m=2. The electromagnetic wave propagating along the z-axis is described by $$E(x, y, z, t) = \left(\sum_p E_p(x) e^{j p z}\right) e^{j(wt - \beta z)}$$

Using this field representation together with a fourier series representation of the index of refraction in the grating region $$n_j^2 k_o^2 = \sum_p A_p(x) e^{jp z}$$

yields an infinite set of coupled wave equations for the fundamental and each of the harmonics of the field $$(d^2/dx^2 + k_{tp}^2) E_p(x) = \Sigma_{p1} A_{p-p1}(x) E_{p1}(x)$$

where $$n^2_j k_o^2 = k_{tp}^2 + \beta_p^2$$

$$\beta_p \beta + pK$$

quantities $\beta$, m and K have been previously defined. The electric field is E and $n_j$ is the index of the refraction of the grating layer. This representation of the field in terms in spatial harmonics is known as the Floquet theorem. See A. Yariv, M. Nakamura, IEEE J. Quantum Electronics, Vol. QE-13, No. 4, April 1977, p. 233. When the set of coupled differential equations is solved with the appropriate boundary conditions and, where the result is singular the, field can exist without input. Transverse resonance exists and energy is guided by the structure. See S. T. Peng, T. Tamir, H. L. Bertoni, IEEE Transactions of Microwave Theory and Techniques, Vol. MTT 23, No. 1, Jan. 1975, p. 123. Peng has described transverse resonance for the case of such periodic structures.

If the guided modes with light energy trapped by transverse resonance now interact with the grating, which satisfies the Bragg reflection condition for the mode, then the mode is reflected back on itself or put in different terms, the mode transfers its energy to its counter propagating pair. Since the mode has the same phase velocity forward and backward, a standing wave is created. The structure is in now a state of both lateral resonance along the z-axis of the guide as well as transverse resonance along the x-axis. The lateral resonance condition differs from the transverse resonance condition in that it is a distributed resonance. The standing wave pattern can exist over an area of infinite extent.

The device structure taught by this invention satisfies two conditions. First, a portion of incident electromagnetic energy is coupled into the guided mode setting up transverse resonance in the structure. Second, Bragg reflection of the mode is established creating lateral resonance so as to form a resonant cavity distributed in space, a cavity which communicates with the outside world through the coupling properties of the periodic structure.

The distributed resonant cavity is a device that when not at a state of resonance is essentially transparent to the incident wave, since there is no coupling. When the cavity interacts resonantly with the incident wave, the energy confinement raises the reradiated power coupled out of the cavity to a level and with the appropriate phase s that it can interfere with and block the portion of the incident wave that does not couple to the cavity and would normally be transmitted.

A simple ray model ca explain the phase shift between the transmitted portion of the incident wave and the reradiated wave at resonance. As shown in FIG. 11, the incident wave, 1, strikes a point on the grating and a portion of the beam is diffracted while the rest, 4, is transmitted normally. Following a ray 2 which is emitted from the grating at point 3 as part of the diffracted wave that couples to the guided mode and travels across the guide layer to surface 5 where it is totally internally reflected and then propagates back across the guide layer to the grating 6. At the grating a portion of the wave 8 is diffracted opposite to the incident beam and a portion 9 is diffracted in the direction of the normally transmitted beam. The phase shift of this diffracted beam 9 relative to the normally transmitted beam 4 is given by the path length traversed by the wave plus the phase shifts associated with the total internal reflection at 5 and the diffractions at 3 and 6. For a well guided mode this phase shift is in the vicinity of 180 degrees. The above is repeated as shown by the incident wave at point 10 and, when resonance is occurring, transmission is blocked, see the action at 9, 11 and 12 at the right side of FIG. 11.

A comparison will now be made of reflectance between transverse resonant case and distributed resonant cavity with both transverse resonance and lateral resonance due to Bragg reflection. This resonant effect is also exhibited by a structure where a guide mode is excited so that the structure is in a state of transverse resonance but where there is no Bragg reflection of the mode. As a result there is no lateral confinement and the mode freely propagates in the z direction. This structure also builds up energy at resonance and blocks transmission in the manner described above. See S. S. Wang, R. Magnusson, J. S. Bagby, M. G. Moharam, J. Opt. Soc. Am. a/Vol. 7, No. 8 Aug 1990, p1470.

The advantage of including lateral resonance by Bragg reflection is the improvement of the energy confinement in the z direction. This gives the distributed resonant cavity superior bandwidth and angular beamwidth characteristics and allows the device to be fabricated over a smaller lateral area, which are critical considerations for practical applications. FIGS. 12a and 12b show the transmission characteristics of a gaussian beam as predicted by a plane wave analysis, where a coupled mode theory model is used to analyze the transmission of the plane wave components of the beam. See R. F. Kazarinov and C. H. Henry, IEEE Journal of Quantum Electronics, Vol. QE-21, p. 144, Feb. 1985. FIGS. 12a and 12 are a comparison of transmission through a resonant grating structure for a distributed resonant cavity versus transverse resonance only. In FIGS. 12a and 12b, the gaussian beam waist size equals 1 mm and the coupling parameters are $h_2 = 200$ cm$^{-1}$ and $h_1 = 6$ cm$^{-1}$. Coupling of the incident wave to the guided wave and Bragg reflection coupling of the backward and forward propagating guided waves are included. Identical coupling parameters are used for both cases. In case 1 a distributed resonance cavity structure with a normally incident gaussian beam is considered, FIG. 12a, i.e., normal incidence on distributed resonance cavity. This is compared with case 2, where the incident gaussian beam couples to the forward propagating guided wave at an off normal angle such that the structure is in state of transverse resonance only and Bragg reflection is not considered, FIG. 12b, i.e., incidence at 45 degrees with transverse resonance only. The figures show the better mode energy confinement properties and improved blockage of transmission for the distributed resonant cavity which is in both transverse and lateral resonance versus the case of transverse resonance alone where the guide wave freely propagates and is clearly offset from the incident gaussian beam.

Other and further objects and advantages of the present invention will become apparent from the following detailed description of preferred embodiments when taken in conjunction with the appended drawings.

BRIEF DESCRIPTION OF THE FIGURES

FIG. 1 is a section through a device according to the invention showing the transparent support layer, the grating and the transparent resonance guide layer.

FIG. 2a shows first order coupling to the guide layer. FIG. 2b shows second order Bragg reflection of radiation produced by first order coupling.

FIG. 4 shows a plot of the reflectance curve against wavelength.

FIG. 5 is another embodiment of the invention showing in schematic cross-section a depletion mode heterojunction diode modulator.

FIG. 7 is another embodiment of the invention showing in schematic cross-section a dynamic grating switch.

FIG. 11 shows schematically the origin of phase shift between incident beam and scattered light from mode.

FIG. 12a is for FIG. 12b is for the case of incidence at 45 degrees with transverse resonance only.

FIG. 14 and 14a show a SLM implemented with an array of integrated resonant reflective modulators in silicon.

DETAILED DESCRIPTION OF THE PREFERRED EMBODIMENTS

Figure 2A:
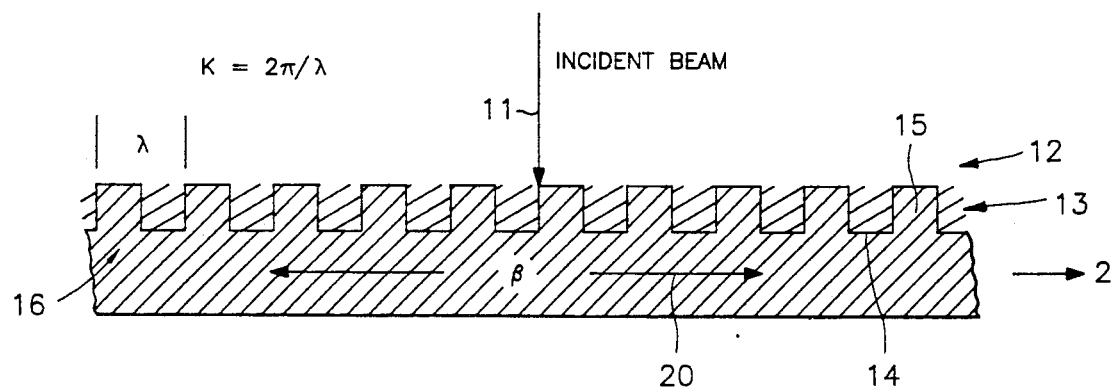
FIGS. 2a and 2b are schematic illustrations of the coupling of normally incident radiation.

Referring now to the drawings and in particular to FIG. 1, there is shown a distributed resonance cavity device 10 for modulation of light beam 11 normally incident on a first semiconductor transparent cover layer 12, implemented in the preferred embodiment in silicon. Silicon is the material of choice and is deemed the best mode for carrying out the invention. Devices made from silicon in accordance with the present invention are the most preferred embodiments. For reference, rectangular coordinate system 18 is provided, and the incident light beam 11 emanates from a laser source (not shown) and is coherent having a preselected wavelength and is propagating along the x-axis. The first transparent cover layer 12 has two surfaces, a first surface 22 receiving the incident light beam and transmitting it to the second surface 23 on which is disposed a grating 13 with grating bars 14 and grooves 15 extending side by side and parallel to the y-axis. The bars and grooves have different indices of refraction and can have different widths and geometries other than rectangular in cross section but the grating must be symmetrical with respect to the x-axis. Embedding the grating and in contact with the first transparent support layer 12 is transparent resonance guide layer 16 which is externally bounded by surface 24. The first layer 12 and the third guiding layer 16 have preselected indices of refraction, n and $n_3$, respectively. A modulated beam exists from surface 24 as indicated by reference numeral 17. The layer 16 can be supported on a substrate (not shown) that is transparent to the modulated beam 17. The silicon device is provided with a control 19 which is coupled to surfaces 24 and 22 and functions to change the relative indices of refraction of the device to drive it between a resonant guided mode when transmission is blocked and a non-resonant mode when transmission is permitted. Control 19 may be as simple as a bistable voltage source, i.e., two voltage levels with switching between the two voltage levels.

The silicon device can be made by known techniques for developing the various layers on a silicon substrate and using known doping techniques for obtaining the different indices of refraction. Specific examples of the present invention, as will be described in detail hereinafter, will serve to illustrate applications of the invention and also specifics regarding materials and layer thicknesses and the manner by which variation or control of the indices of refraction is accomplished.

Figure 2B:
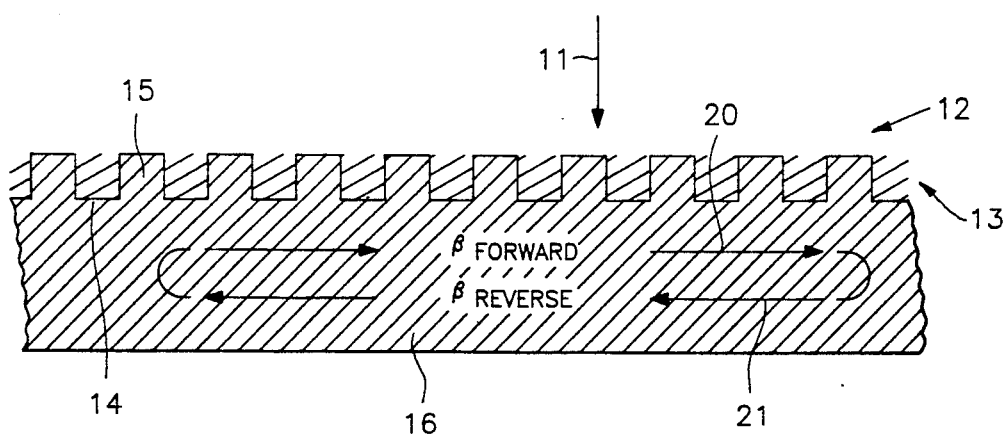

Now referring to FIG. 2a in conjunction with FIG. 1, there is shown the action in the distributed resonant cavity. Shown is coupling of normally incident radiation to the guided mode. As shown a normally incident radiation 11 of wavelength λ is transmitted through first layer 12, is diffracted by the grating 13, and produces radiation 20 propagating along the z-axis with propagation constant $\beta = mK$ for $m = 1$ for first order coupling. The separation of the grating bars is the grating period Λ, and the grating characteristic number K is $2\pi/\Lambda$. Now referring to FIG. 2b in conjunction with FIG. 2a and FIG. 1, the present invention teaches the Bragg reflection of the diffracted radiation 20 in the reverse direction 21 along the z-axis forming a standing wave in the guide layer 16, Bragg reflection of guided mode. The resonance radiation in the guide layer 16 feeds back through the grating in phase relation to the incident radiation such that the incident radiation is reflected when the resonance is excited. Transmission of the light through the device is precluded at resonance. Thus, $\beta_{forward} - \beta_{reverse} = 2\beta = mK$ for $m = 2$, 2nd order. In accordance with the teachings of this invention, an output beam exists in the absence of a resonance and is extinguished when the resonance is excited in the guide. The distributed resonance wavelength of the device depends on the bar spacing λ of the grating and on the optical properties of the layers and the layer thickness.

For a given embodiment of the invention, light of variable wavelength will be transmitted through this device except for values of λ substantially equal to resonance value. For light of a fixed wavelength λ, modulation of transmission through the device is achieved by control of the distributed resonance wavelength of the device. In the preferred embodiment, the grating period is less than the wavelength of incident beam 11 and the thickness of layer 16 is less than a wavelength of incident beam 11. However, when using a semiconductor material, such as silicon, the grating period is preferably less than half the wavelength of the incident beam 11. When using a medium, such as glass, then the grating period is preferably less than the wavelength of beam 11 but more than half the wavelength of beam 11.

Figure 3A:
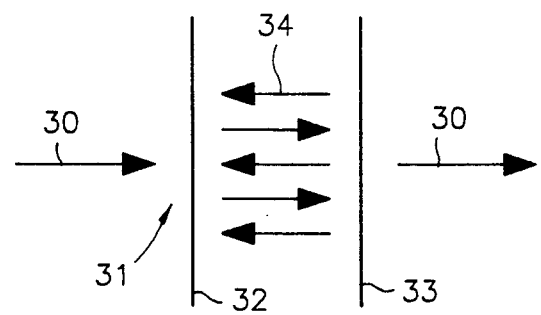
FIGS. 3a and 3b show prior art resonance cavity structures for comparison with the present invention which is schematically shown in FIG. 3c.
Figure 3B:
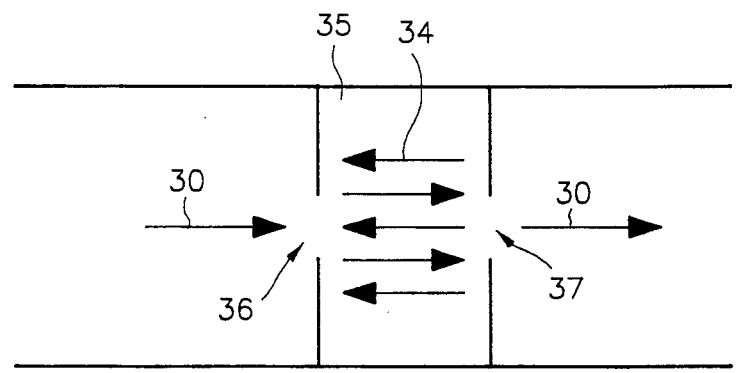

FIGS. 3a and 3b show two well know prior art resonance cavity structures. In the Fabry-Perot device 31 of FIG. 3, a small portion of the incident light beam 30 passes through half silvered mirror 32 and is reflected by half silvered mirror 33. Under resonance conditions, waves are reflected back and forth between the two mirrors with the proper phase relationship to set up a standing wave. The energy build up in the standing wave pattern is sufficient to transmit through mirror 33 beam with the intensity of the incident beam. The Fabry-Perot device is a bandpass filter at resonance.

In the microwave cavity 35 of FIG. 3b, incident radiation 30 enters the cavity 35 through aperture 36. Away from resonance the impedance mismatch at the aperture 36 causes the beam to be reflected. At resonance conditions, standing waves 34 are produced such that energy builds up in the cavity and radiation can be coupled out through aperture 37. This device again serves as a bandpass filter.

Figure 3C:
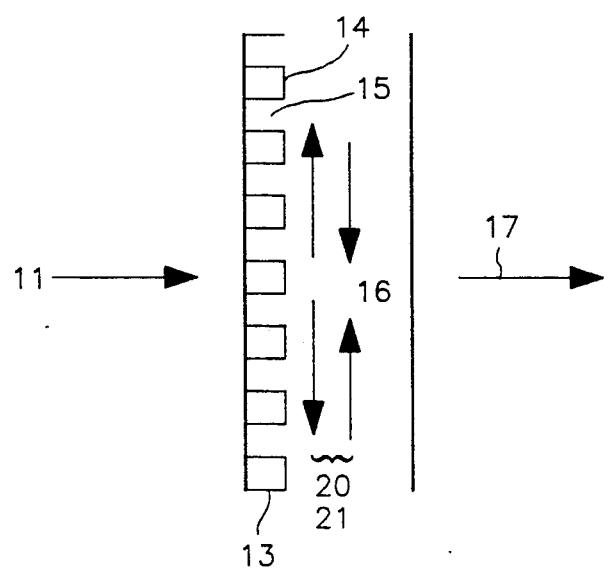

In contradistinction to the prior art, the present invention in FIG. 3c shows the grating 13 and the resonance guide 16. There are no large impedance mismatches as in the Fabry-Perot and Microwave cavities due to the mirrors and apertures. Therefore, the incident beam is freely transmitted through the structure. At resonance, energy is coupled out of the standing wave pattern 20-21 with the proper phase to interfere and cancel the normally transmitted beam. The device of the instant invention may therefore be characterized as a bandstop filter.

Referring to FIG. 4, there is shown the general reflectance characteristics of devices embodying the present invention i.e. a distributed resonant cavity. As shown, a maximum 42 in the reflectance curve 41 is achieved at resonance 43 with wavelength $\lambda_1$.

Referring to FIG. 5, another embodiment or specific application of the present invention is shown and is in the form of a depletion mode heterojunction diode modulator 50. Modulator 50 consists of transparent conducting electrode 51 which overlies a grating 56. A heavily doped p type region 60 acts as a low index substrate. A p+contact layer 61 is appropriately developed by known techniques on one face of substrate 60. To its opposite face is grown by known methods, a lightly doped n type region, layer 59, of high index alloy. An n+contact layer or region is appropriately developed on the layer 59 and then etched by conventional means to develop bars 58 and grooves 57 of the grating 56. Electrode 51 fills in the grooves 57. A voltage source and signal source control 54 serving as the means for controlling modulator 50 is connected on its +side by lead 53 to a contact 52 on the surface of electrode 51 and on its - side by lead 55 to a contact 62 on the surface of p+contact 61. The resonance condition is controlled by imposing a control signal via controller 54 (which includes switching means) to effect changing of the index of refraction in the guide layer 59 (external source 54 of electromotive force, EMF, connected to contact terminals 52 and 62). The electric field produced by the EMF, in particular through the lightly doped, high index semiconductor guide layer 59, within the depletion region of the reverse biased diode depletes the carrier concentration and raises the index of refraction. In other words, the depletion region of the reversed biased diode is shifted within the lightly doped high index alloy region 59. Changing the index of refraction changes the resonant wavelength. Rapid tuning of the device resonance wavelength provides prompt modulation of the incident beam 11 which is readily transmitted through the device for resonance wavelengths other than the wavelength of the incident radiation and emerges as modulated beam 63. By selection of only two control voltages, one producing a distributed resonance cavity in layer 59 to block incident beam 11 and one producing transmission and by providing rapid switching between the two voltages by any simple known switching or gating technique, the modulator 50 can be made responsive to a digital input signal to transduce same into a corresponding digitally modulated beam 63. Controller 54 preferably provides this function using a control signal having a DC component with an AC component superimposed thereon.

A specific example of the depletion mode heterojunction diode modulator 50 is shown in FIG. 5 and consists of the following specific materials. Layer 51, the transparent conducting electrode, can be fabricated from indium tin oxide, $In_2O_3$:Sn, the thickness depending on the desired resistance of the leads (in the range of 1 μm.).

Layer 56, the grating, can be an n+ contact region fabricated from an alloy of composition 10% Germanium, 90% Silicon ($Sl_{.9}Ge_{.1}$) doped with a donor material such as phosphorus to a level of $10^{19}$ per $cm^3$. Thickness is on the order of 500–1000 Angstroms.

Layer 59, lightly doped n type region high index alloy, is fabricated from the same alloy as layer 56 ($Sl_{.9}Ge_{.1}$) with a donor doping level of $10^{17}$ per $cm^3$. Thickness is about 0.6 μm. Both layers 56 and 59 are grown epitaxially on silicon substrate 60 by CVD (chemical vapor deposition).

Layer 60, heavily doped p type region, is a silicon wafer of crystallographic orientation (111) which is doped with an acceptor material such as boron with an acceptor doping level greater than $10^-$ per $cm^3$. Thickness is that of a wafer, approx. 150–200 μm.

Layer 61, p+ contact region, is the backside of silicon wafer 60 with an approx. 1 μm thick region of acceptor doping level of $10^{19}$ per $cm^3$.

Controller 54 operates with a control operating voltage such that the diode is reverse biased between 0–10 volts.

Figure 6A:
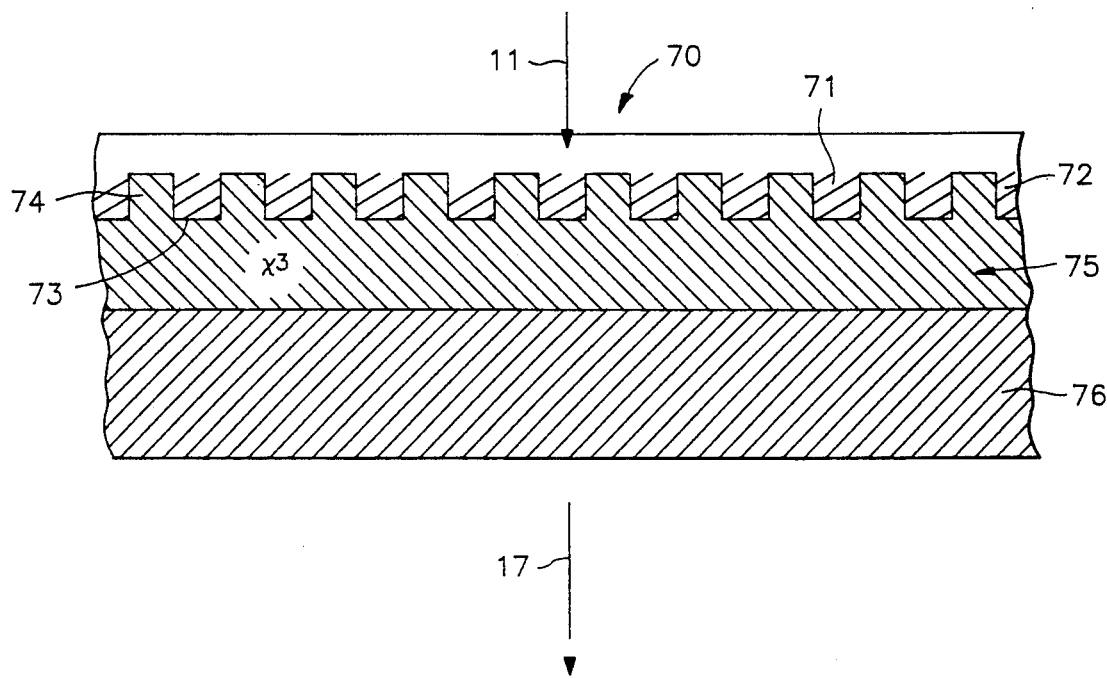
FIGS. 6a and 6b are another embodiment of the invention showing in schematic cross-section a bistable switch using non-linear medium in a distributed resonant cavity in FIG. 6a. A plot of the reflectance as the function of incident intensity is shown in FIG. 6b.
Figure 6B:
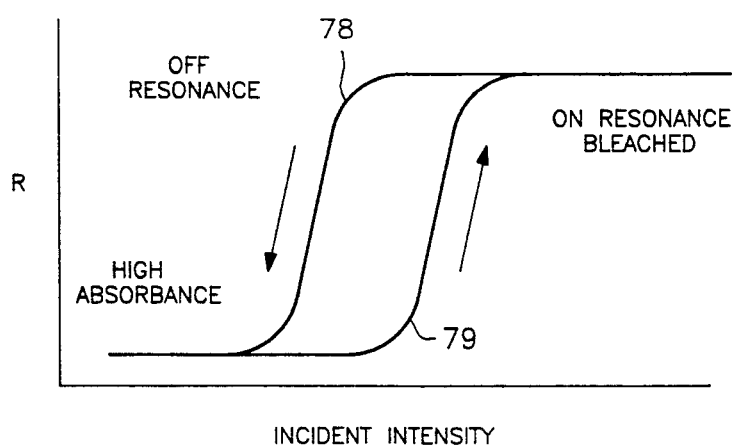

FIGS. 6a and 6b show another embodiment of the present invention in the form of a bistable switch 70. In FIG. 6a, bistable switch 70 consists of substrate 76 on which is developed a non-linear medium which serves as a guide region or layer 75. The surface of region 75 is etched by known means to develop bars 74 and wells or grooves 73 of a grating structure 72 Although not necessary, a transparent cover layer 71 may be developed by known means on grating 72. The guide layer 75 is a non-linear medium (sometimes referred to as chi three) disposed on substrate 76 such that the index of refraction and/or absorbance depends on light intensity. The resonance wavelength of the device is shifted optically by varying the intensity of the incident light beam 11 or using an ancillary beam for this function. The means for varying the intensity of incident light beam 11 are well known and are not shown for sake of simplicity. The resonance traps light in the distributed resonance cavity, builds up large intensities, and such intensities change the refractive index of the material and thus substantially shift the resonance wavelength frequency.

Alternatively, for a saturable absorber, the absorbance is reduced by increasing the intensity in the cavity. The reduction in absorbance allows the intensity in the cavity to build up to stronger levels at resonance. A positive feedback results as illustrated in FIG. 6b where an increase of the intensity builds up the fields in the structure which causes the material properties to change in the direction that brings the system into resonance. FIG. 6b shows graphically reflectance as a function of incident intensity for saturable absorbance. The positive feedback leads to a sharp transition from resonance to non-resonance states as a function of intensity. The resulting hystersis 78–79 creates a bistable element that can be used for optical memory and switching.

As a specific example, the layer 75 is fabricated from cadmium sulfide, CdS, and the substrate 76 is glass. The grating 72 is created by etching the CdS layer 75 to form grooves 73 which are filled only with air. No cover layer 71 is used.

Referring to FIG. 7, another embodiment and specific example of the present invention is shown as a dynamic grating switch 80 consisting of a substrate 82 upon which is developed by known means a non-linear medium 81 serving as the distributed resonant cavity or guide region and contains at its upper surface a grating. The transparent cover layer may be omitted. In this embodiment the grating is written in a thin film layer 85 by two interfering laser beams 83 and 84 which create the bars 86 and grooves 87. The film layer 85 is photorefractive so that it records the intensity pattern of the writing beams as an index gradient. Modulation is achieved by changing the angle of the writing beams 83 and 84 thereby changing the grating period. The advantage of this embodiment is the remote control by optical means while the disadvantage is the relatively slow speed of most photo-reactive materials and the need to change the angles of the writing beams.

In a specific example of the dynamic grating switch shown in FIG. 7, the substrate is a crystal plate of lithium niobate ($LiNbO_3$) cut with the appropriate crystallographic orientation to support the desired type of guided wave (X or Y cut for TE modes and Z cut for TM modes). Layer 81 is a region at the surface of the crystal plate into which titanium has been diffused. Titanium indiffused lithium niobate is normally prepared by depositing a layer of titanium metal on the surface of the lithium niobate and then heating the sample in the appropriate gaseous environment so that the titanium diffuses into the crystal forming a layer rich in titanium. This region has a sufficient concentration of titanium and is thick enough to support a guided wave. As discussed in the literature impurities such as iron or copper may be desirable with the titanium to support the nonlinear photorefractive effect. The titanium indiffused guide layer supports a single guided mode and exhibits a photorefractive (nonlinear) effect. In addition, the strips 86 and 87 representing the regions of different index of refraction that are segments of the grating written in the photorefractive material extend all the way through the guide region 81 but have been shown with partial extension for sake of clarity.

Figure 8:
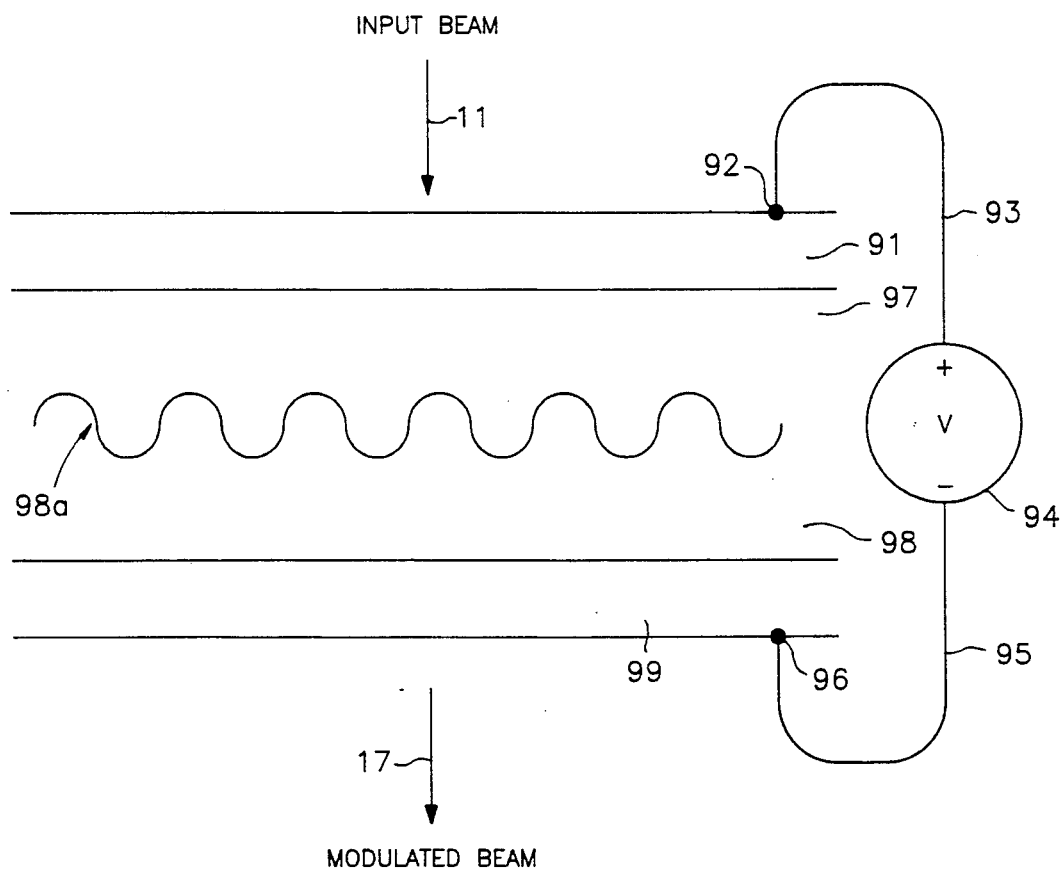
FIG. 8 is another embodiment of the invention showing in schematic cross-section a MOSFET modulator with a surface plasmon distributed resonant cavity.

FIG. 8 shows an embodiment of the invention based on surface plasmons as the guided wave. Surface plasmons are established in the distributed resonance cavity of a MOSFET modulator 90 which consists of a p type silicon substrate 98 having conventionally developed on one face a p+contact layer 99. The other face of substrate 98 is developed by conventional techniques into a grating 13 with bars and grooves in conjunction with a SiO$_2$ gate insulator 97. Transparent electrode 91 overlies layer 97. A thin inversion layer 98a exists at the boundary between the gate insulator 97 and silicon substrate 98, of the metal oxide semiconductor field effect transistor (MOSFET), and supports the surface plasmon as the guided mode or wave. Such surface plasmons in very thin layers are known to be of long range. Propagation of the plasmon depends upon the carrier concentration in the inversion layer 98a. The carrier concentration is controlled by an electric field provided by controller 94 which controls an EMF source which is connected via leads 93 and 95 to contact terminals 92 and 96 disposed on opposite external surfaces of the device. The incident input beam 11 (TM polarized) is transmitted as a modulated beam 17 when the device resonance wavelength is unequal to the wavelength of the beam and the input beam 11 is reflected when the device is tuned to the same wavelength as that of the input beam.

In a specific example, the MOSFET modulator 90 of FIG. 8 consists of layer 91, the transparent conducting electrode, fabricated from indium tin oxide (In$_3$O$_3$:Sn). The thickness depends on the desired resistance of the leads but is in the range of 1 μm.

Layer 97, the silicon dioxide gate insulator, is on the order of 1000 Angstoms thick. The material is silicon dioxide, SiO$_2$, grown by thermal oxidation of the silicon wafer substrate 98.

Layer 98, the p type silicon wafer substrate, is of crystallographic orientation (100) with an acceptor doping concentration of $10^{16}$ per cm$^3$. Thickness is that of a typical wafer as described with reference to FIG. 5.

Layer 99, the p+ contact region, is on the backside of silicon wafer 98 with an approximate 1 μm thick region of acceptor doping level of $10^{19}$ per cm$^3$. The modulator 90 is controlled via controller 94 with an operating voltage so that positive voltage is applied to transparent electrode 91 between 0-5 volts.

The inversion layer supporting the surface plasmons is on the order of an Angstrom in thickness and is situated at the interface between the gate insulator and the silicon substrate as already noted.

Figure 9:
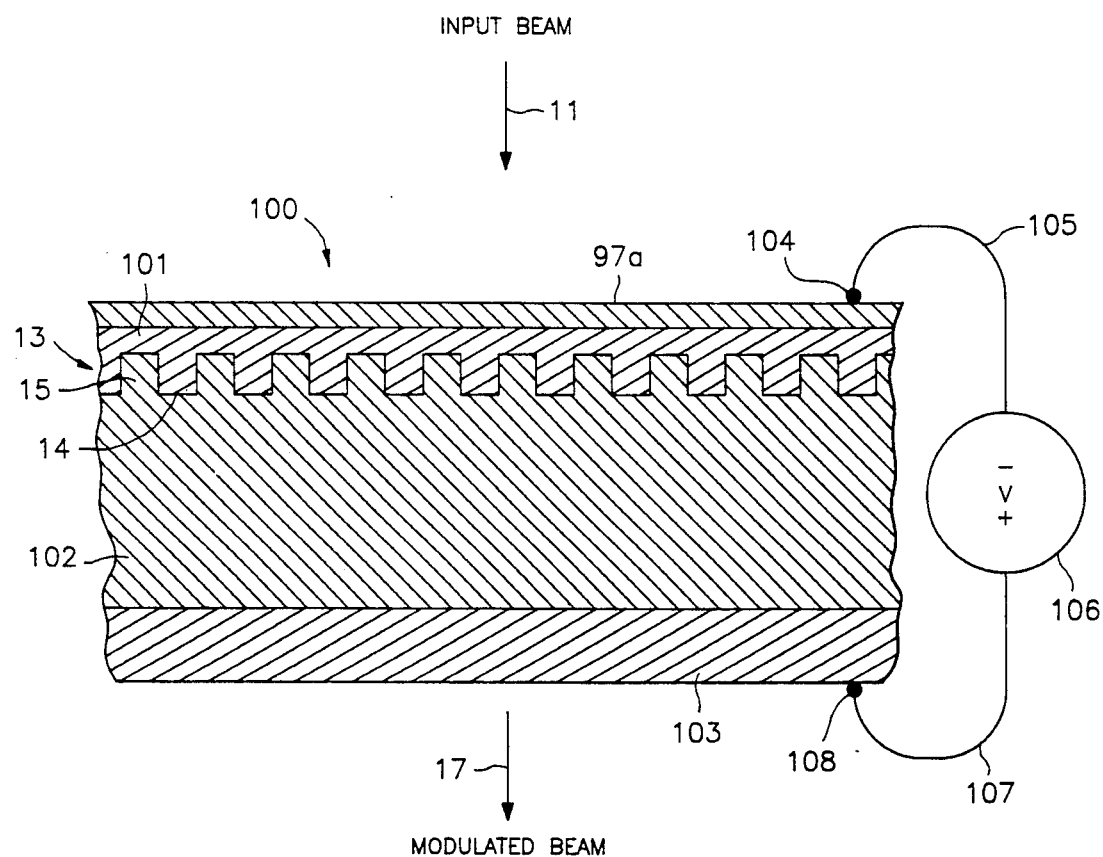
FIG. 9 is another embodiment of the invention showing in schematic cross-section a Schottky diode modulator with a surface plasmon distributed resonance cavity.

FIG. 9 shows another embodiment using surface plasmons in a Schottky diode modulator 100 which consists of an n type silicon substrate 102 having an n+contact 103 conventionally developed on one face and in conjunction with a semi-transparent thin metal layer 101, a grating 13 including bars and grooves 14-15 on its other face. The grooves are filled with substrate 102. In the Schottky diode modulator 100, the carrier concentration change in the depletion layer between the thin metal layer 101 and the semiconductor 102 is used to modulate the index of refraction. The metal layer 101 supports surface plasmon at the metal-semiconductor interface and provides the metal portion of the Schottky junction. The metal layer 101 must be kept extremely thin so that it does not absorb too much of the incident light. This device as described can function as a very robust tunable filter/modulator. Controller 106 provides the control signal via leads 105, 107 to contacts 104, 108, respectively.

A specific example of the Schottky diode modulator 100 shown in FIG. 9 is as follows. A cover layer of sputtered glass or semiconductor layer 97a covers the thin metal layer 101 to provide protection and modify the propagation characteristics of the plasmon. Layer 101, the semi-transparent thin metal layer, is composed of silver and is approximately 100-150 Angstroms thick. Layer 102, the n type silicon wafer substrate, has a donor doping concentration of $10^{17}$ per cm$^3$. Thickness is at least several microns. Layer 103, the n+ contact region, is on the backside of silicon wafer 102 with an approx. 1 μm thick region of donor doping level of $10^{19}$ per cm$^3$. The controller 106 is operated to a control operating voltage so that the diode is reverse biased between 0 to −5 volts on silver layer 101.

As noted previously, the thicknesses of the layers of these various devices depends upon the wavelength of the light that is to be modulated. The thicknesses given in the specific examples are for use with radiation having a wavelength of about 1.3 μm., near infrared radiation. The grating teeth height and duty cycle depend on the bandwidth and angular beamwidth characteristics of the desired modulator. Also, in silicon, donor generally refers to phosphorus and acceptor to boron, as these are the materials of choice.

Figure 10:
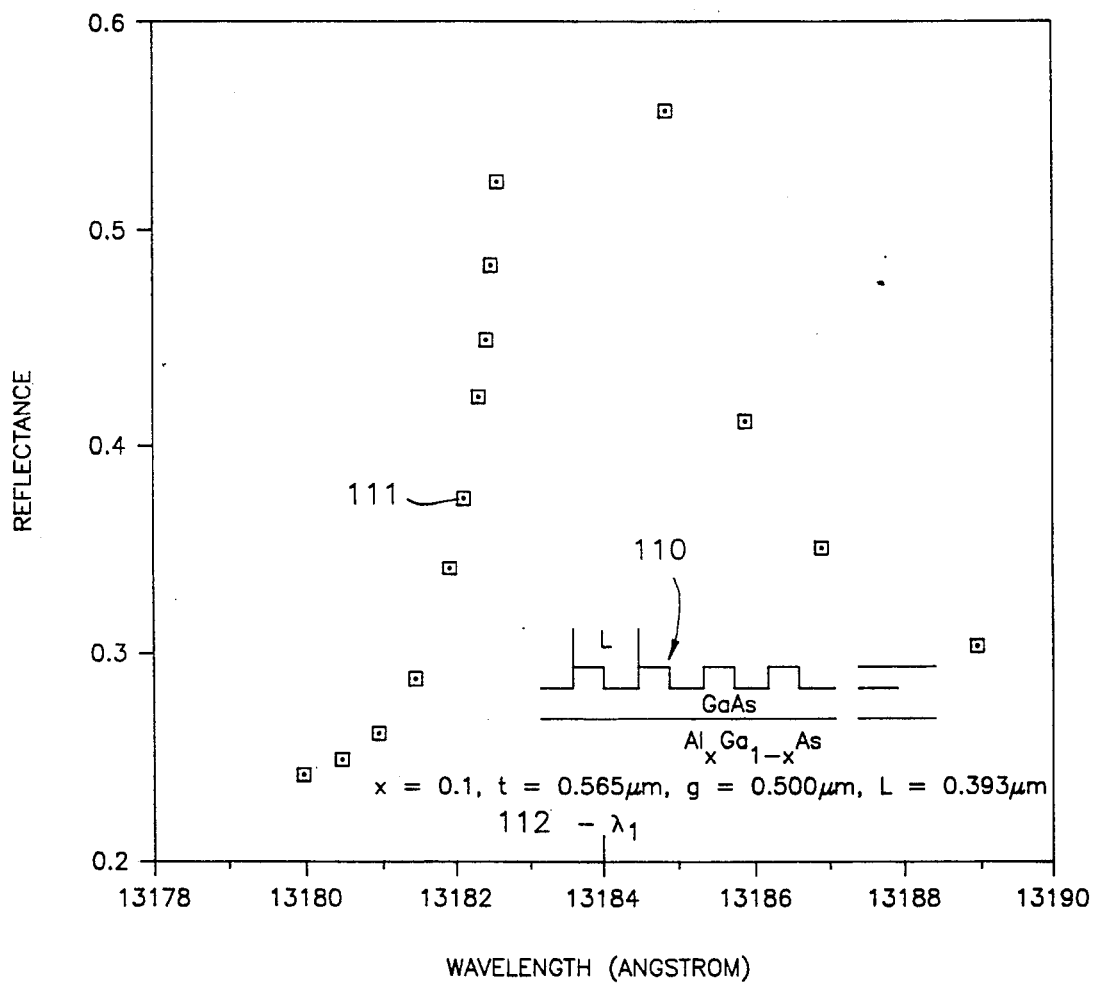
FIG. 10 illustrates the computed reflectance peak at resonance for one embodiment.
Figure 12A:
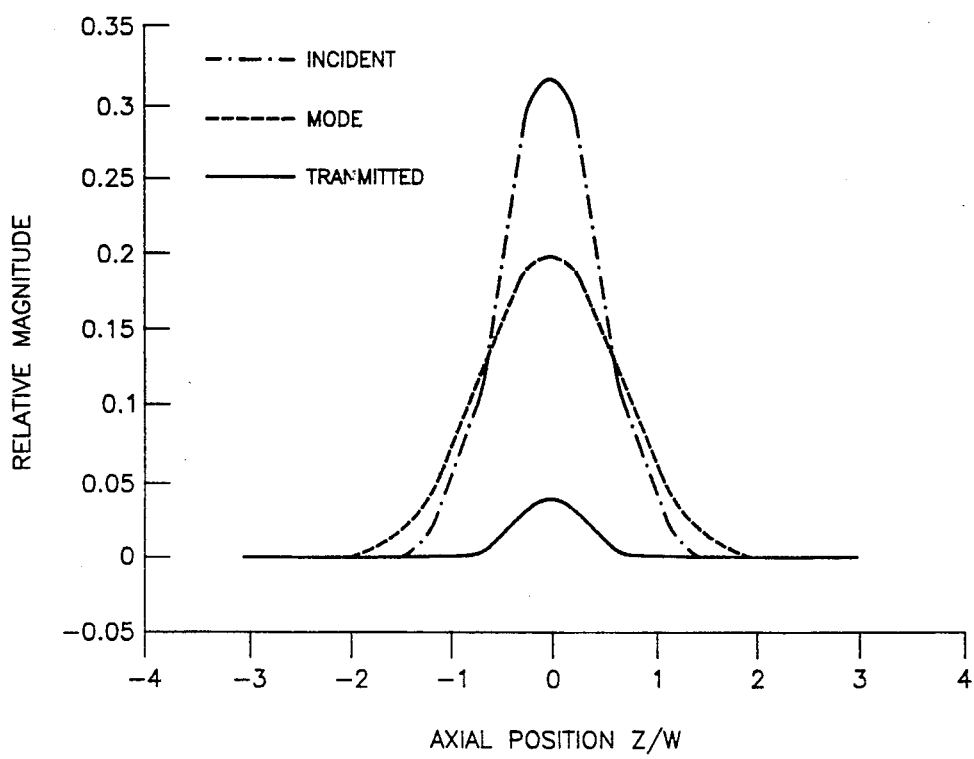
FIGS. 12a and 12b shows graphically a comparison of transmission through resonant grating structure for distributed resonant cavity versus transverse resonance only.
Figure 12B:
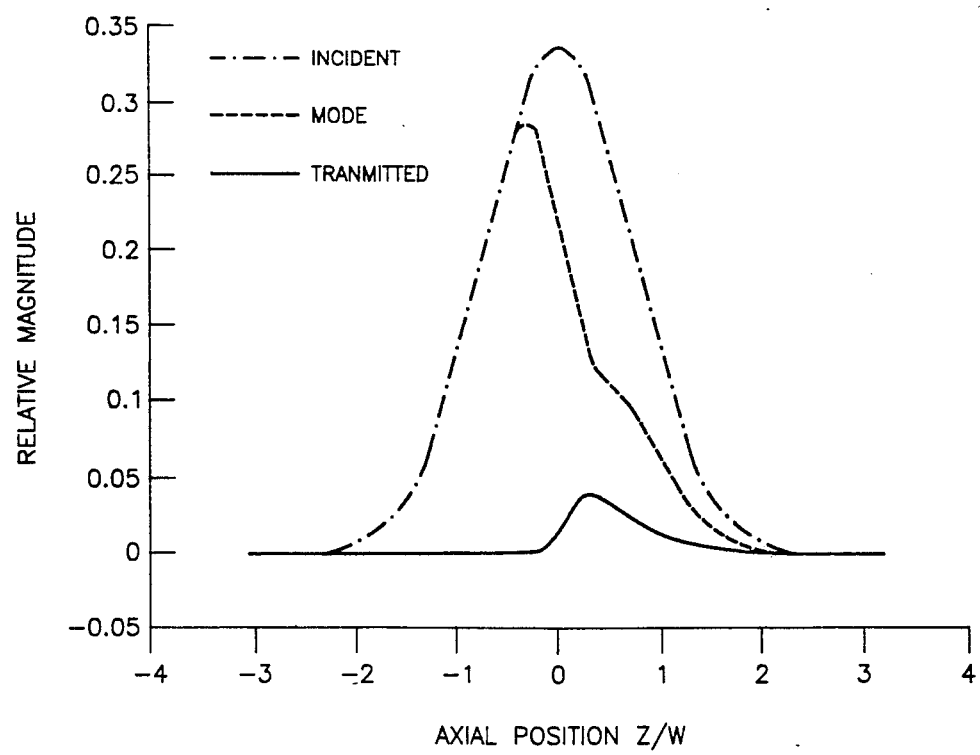

Referring to FIG. 10, the reflectance peak at resonance is illustrated by plot of computed reflectance values 111 for a specific resonant structure 110 detailed in the lower right corner. The maximum in the reflectance occurs at resonance 112 for which the resonant wavelength is $\lambda_1$.

Preferred applications of the device embodiments are shown in FIGS. 13-17 and are shown for spatial light modulation (SLM). In a spatial light modulator 35 devices are arranged in a two dimensional array (rows and columns) as part of the fabrication process. Each of the devices is addressable optically or electronically (as known) to control the resonant reflection. The lateral resonance due to Bragg reflection is used to provide energy confinement, laterally minimizing the individual element size. Such a spatial light modulator (SLM) using this invention has numerous applications including, incoherent to coherent light conversion for optical correlators, optical computing and optical addressing and interconnects in general.

The main advantage of this invention over existing SLM technology is the narrow bandwidth of the resonant reflectance, which can be made to match the bandwidth of a single mode laser. A small change in optical properties within the modulator is thereby sufficient to shift the reflectance resonance relative to the laser frequency to achieve sizable modulation. As a result, material whose optical properties can be modulated marginally can now be utilized to fabricate modulators. The best example (and most lucrative) is silicon, as shown in the modulator embodiments of FIGS. 5, 8 and 9. These modulators can be integrated into 2 dimensional arrays readily, using technology from the integrated circuit industry. Together with the modulators, associated logic and drive circuits as well as photodetectors, which of themselves are known in the art, can be integrated or connected to give the SLM a broad range of operating characteristics.

Figure 13:
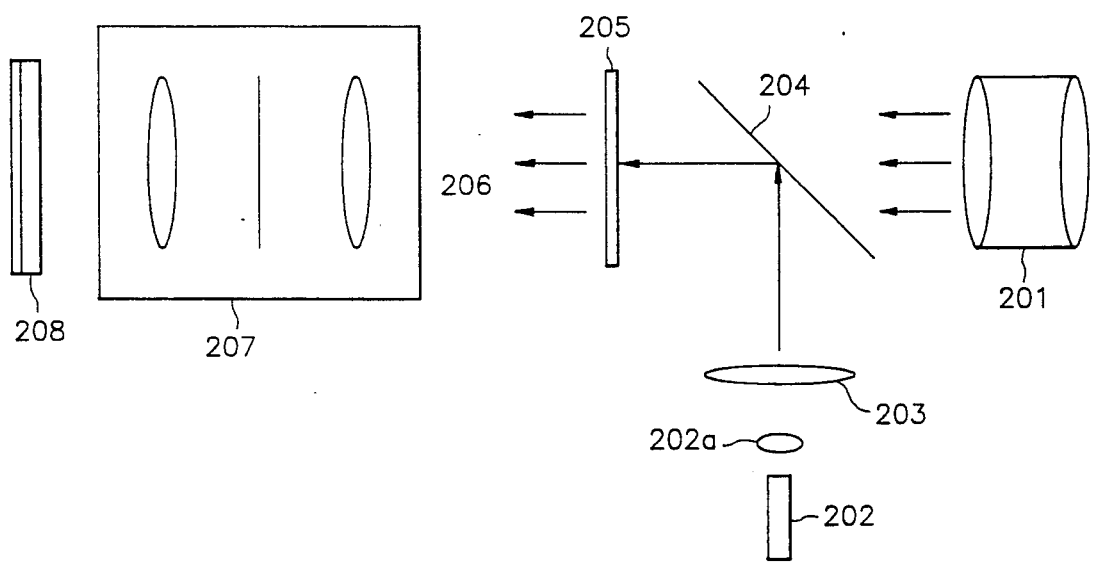
FIG. 13 shows a coherent optical correlator using incoherent to coherent image conversion with resonant reflectance SLM.

The application of an SLM, based on this invention, with a collimated laser beam for incoherent to coherent light conversion is shown in FIG. 13. A laser source 202 via lenses 202a and 2303 feeds coherent collimated light to dielectric mirror 204 and then to a resonant spatial light modulator array 205 and optical correlator 207 wherefrom it is received by a CCD camera 208. The SLM 205 is addressed with an incoherent scene, 201. The incoherent light intensity controls the transmission of the laser light 206 through the elements of the array 205, creating a picture which is presented to the optical correlator 207 and CCD camera 208.

Figure 14:
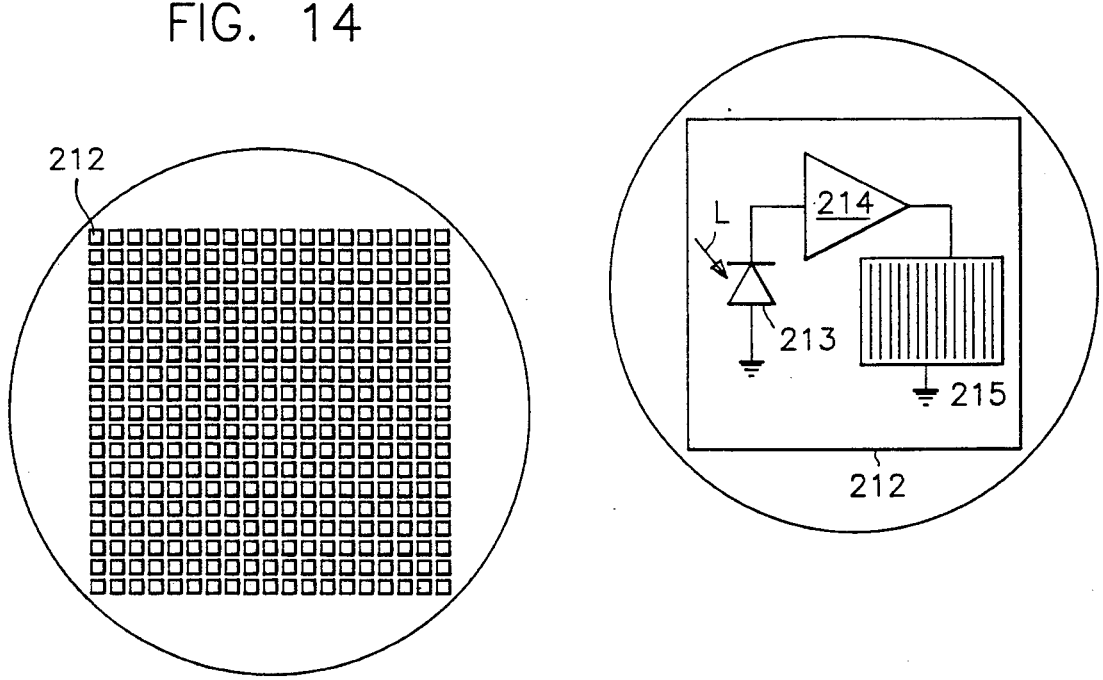

An SLM for this purpose, which is based on this invention is shown in FIG. 14. This SLM is implemented in silicon and takes advantage of integrated circuit fabrication technology to integrate a modulator 215, detector 213 and drive circuitry 214 for each element or pixel 212 in the array 205. The detector 213 can be a photodiode with a suitable amplifier serving as the drive circuit 214. The modulator 215 can be an embodiment such as shown in FIGS. 5, 8 or 9. This device receives an image of incoherent light (arrow L) in the visible, detects it by photodiodes 213, and converts it via amplifiers 214 and modulators 215 to a coherent image in the infrared where silicon is transparent. The transmission of a laser through the modulators 215 is controlled by amplifiers 214, producing a control signal at two stable voltages that allow transmission or produce reflectance in response to the detected outputs of photodiodes 213.

Figure 15:
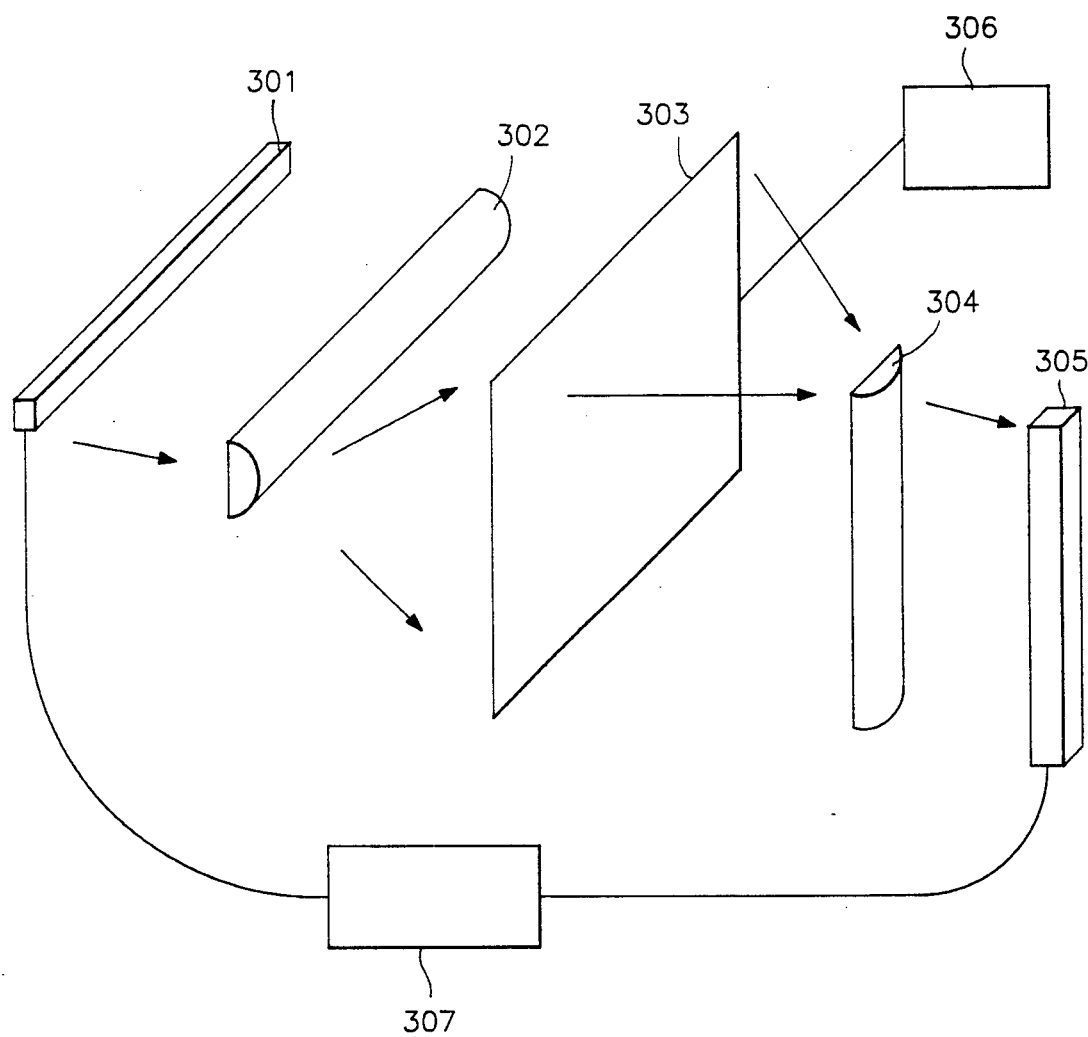
FIG. 15 shows a 2D optical neural network utilizing vector matrix multiplication with SLM.

SLMs ar widely used for optical computing. FIG. 15 illustrates the application of an SLM in optical computing as part of a 2D optical neural network. The SLM is used to perform vector matrix multiplication as part of an electronically programmable interconnect matrix. An SLM based on this invention, such as the one pictured in FIG. 14 could be used for this purpose, where the modulator is electronically controlled rather than controlled just by a photodiode. The network consists of a known linear LED array 301 whose output passes through cylindrical lens 302 and is received by SLM 303 whose output in turn is gathered by cylindrical lens 304 and passed to linear detector array 305. Block 306 is a conventional drive arranged for the SLM 303 according to the invention and block 307 is a known electronic threshold for driving array 301 from the output of 305.

This 2D optical neural network could potentially be realized as a compact set of stacked silicon wafers, where the cylindrical optics and LED array have been replaced by another SLM 303 and a 2D array of detectors 305 where the SLM presents a column in place of each LED element and the 2D detector array processes a row corresponding to each element in the linear detector array. This arrangement is shown in FIGS. 16a and 16d.

Figure 16B:
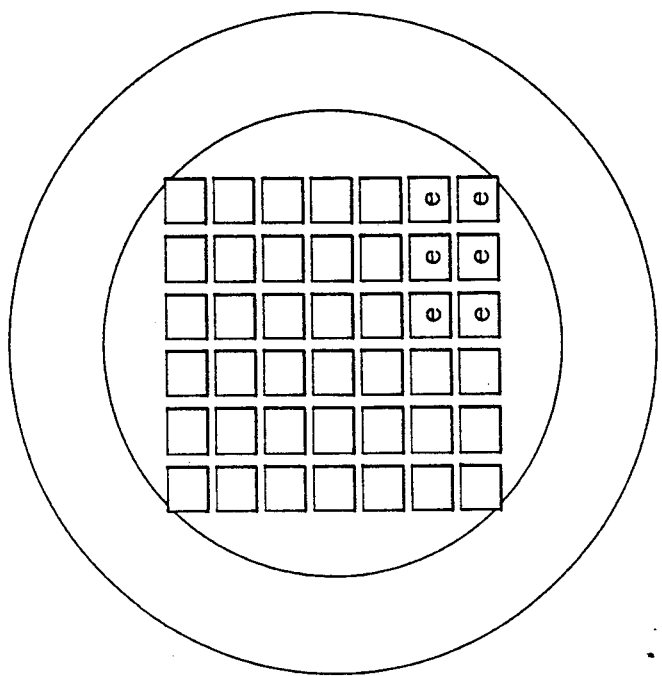
FIGS. 16a and 16b show a silicon wafer stack implementation of 2D optical neural network utilizing the novel resonant reflective modulators.
Figure 16A:
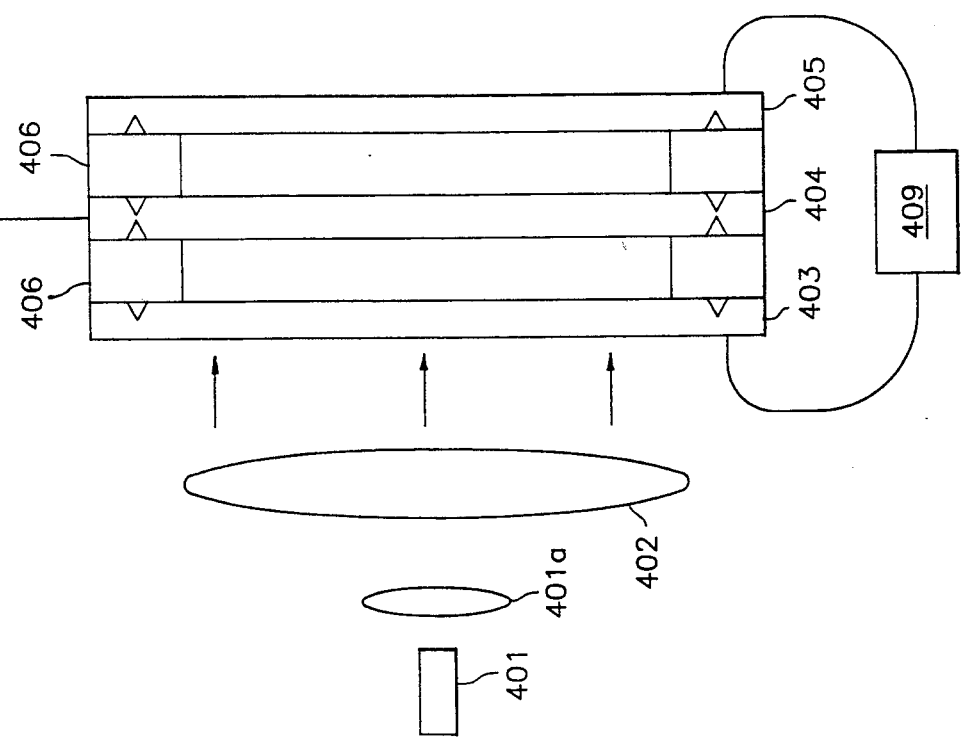

As shown in FIG. 16a and 16b a silicon wafer stack is comprised of SLM 403 (replacing the LED array of FIG. 15), SLM 404 and 2D (two dimensional) detector array 405 separated by spacers 406. Each wafer 403, 404 and 405 has the configuration as shown in FIG. 16b with each modulator or detector element on each wafer identified by reference letter e. Laser 401 via lens 401a and collimator 402 drives the wafer stack with block 407 providing the electronic drive for the SLM 404 and block 409 establishing appropriate thresholds for the SLM 403 from the output of 405.

Figure 17B:
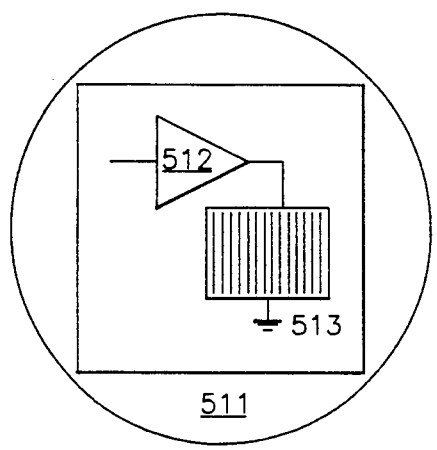
FIGS. 17 and 17a-17c show a silicon wafer and chip layout including communication modules integrated at chip input and output pins using resonant reflective modulators according to the invention.
Figure 17:
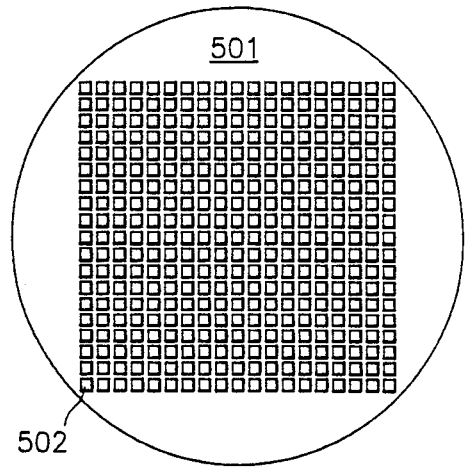
Figure 17A:
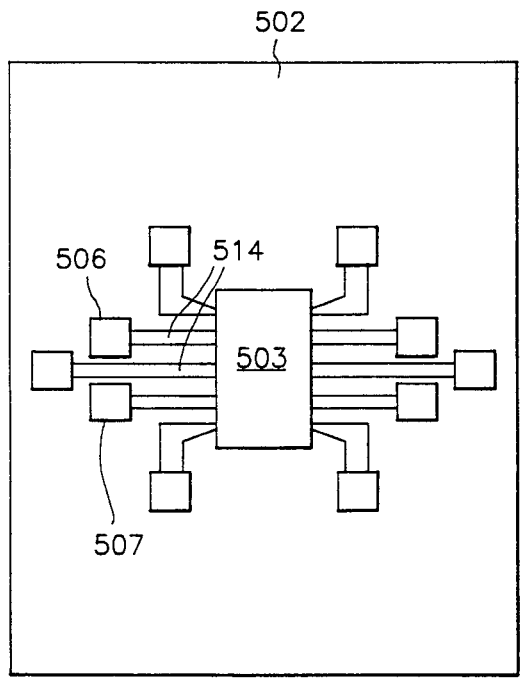
Figure 17C:
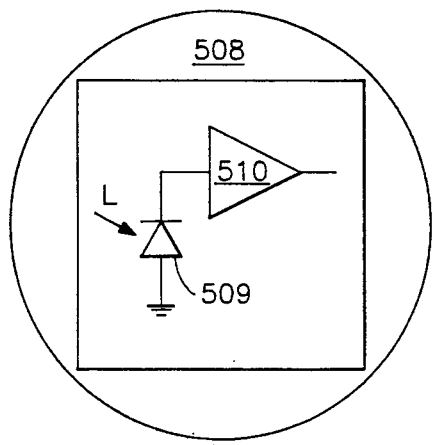

Integration in silicon, of the resonant reflective modulator together with a detector and appropriate drive circuitry, as in FIG. 14, can also be utilized to place communication modules on chips and on wafers for implementing optical interconnects between such chips on wafers. An example of such an optical interconnect scheme is shown in FIG. 17. Given a suitable architecture, a large number of conventional processors with such communication modules could be interconnected for parallel processing applications. Today, this is a very active field in computing for which the resonant reflective modulator may provide a potential solution to the interconnect problem. As shown, a wafer 501 contains multiple chip areas 502 arranged in rows and columns. Each chip are 502 contains pad input 507 and pad output 506 with connections 514 to a chip 503 for electronic processing. Optical input module 508 is mounted on pad 507 and optical output module 511 is mounted on pad 506. Optical input module 508 contains a photodetector diode 509 which receives and detects light as indicated by arrow L. Diode 509 is driven by a known drive circuit or amplifier 510 whose output is fed to chip 503 for processing. The optical output module 511 contains a resonant reflectance modulator 513 as previously described, fed with a laser, not shown, and controlled by a known drive circuit or amplifier 512 receiving its instructions or control signals from chip 503. The control signals from amplifier 512 determine transmission or reflectance of the laser through modulator 513 thereby transducing the control signals to a digitally modulated output laser beam.

Figure 18A:
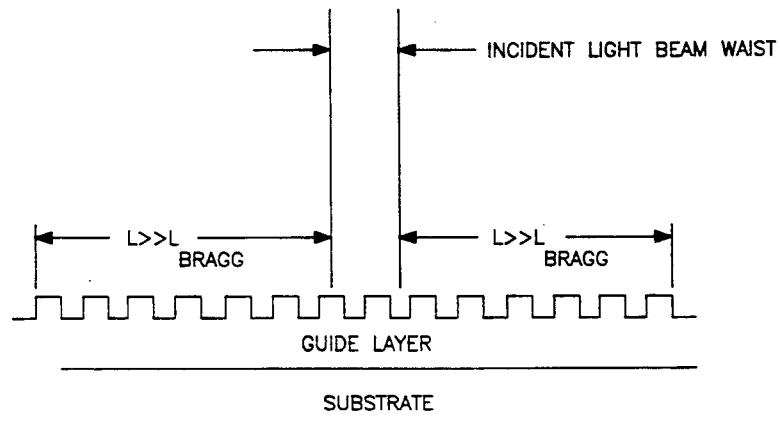
FIG. 18a shows the lateral dimensions of the grating region
versus incident beam.

The device descriptions previously given show a grating region which extends laterally over the whole surface of the device. In order for a device to work optimally in accordance with the present invention and properly, the incident beam must be of a lateral dimension that is considerably smaller than the lateral extent of the grating region. More precisely, the distance from the edges of the incident beam to the edges of the grating region must be greater than the Bragg length of the grating as shown in FIG. 18a. The Bragg length of the grating is defined as the reciprocal of the coupling coefficient between the counterpropagating modes as calculated from coupled mode theory. See A. Yariv, IEEE Journal of Quantum Electronics, Vol. QE-9,919, 1973.

Figure 18B:
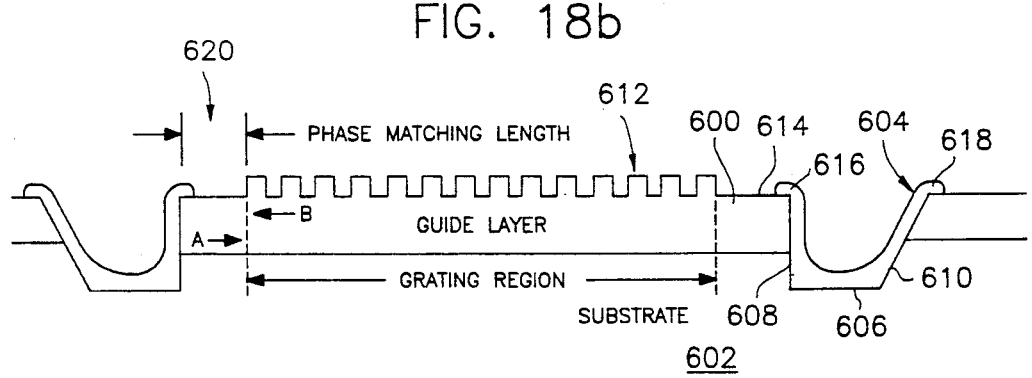
FIG. 18b shows in cross section a grating termination with metal reflectors.
Figure 18C:
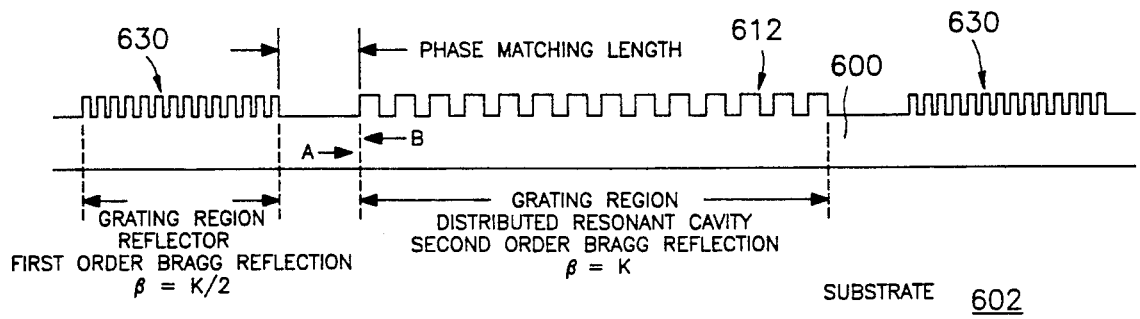
FIG. 18c shows in cross section a termination with first order Bragg reflectors.

The termination devices shown in FIGS. 18b and 18c allow the grating to be terminated at any desired lateral dimension; the device so terminated will modulate completely the incident beam falling on the grating region between the terminations. The terminations are reflectors with appropriate phase matching lengths such that the guided wave, A, that is reflected at the reflector returns to the grating region with the same magnitude and phase as the counterpropagating guided wave B. When A=B at the ends of the grating, the grating will have the properties of the infinite grating even though it has been terminated with a finite size.

The reflector in FIG. 18b is a mirror made by etching through the guiding layer 600 and into the substrate 602, ion polishing the surface to insure smoothness and then evaporating a coating 604 of silver or gold as a metal reflector.

The pit or well 606 created by etching through layer 600 into layer 602 has a vertical or normal side 608 adjacent the grating 612 and an inclined side 610 remote from the grating 612. Although side 610 is shown as inclined, it is not necessarily so as this depends upon the etching technique used. The coating 604 overlaps the top surface 614 of layer 600 as indicated at 616 and 618. The result of the above is etched pits with polished walls. The terminations are spaced a phase matching length 620 on either side of grating 612.

The reflector in FIG. 18c is a Bragg reflector which is a grating 630 that reflects the guided mode in first order as opposed to the second order as is the case for the main grating region of the distributed resonant cavity. Bragg reflection in the first order ensures that there is no radiated wave from the structure and there is complete reflection. The grating period is smaller and the grating can be made deeper than the main grating region, where the grating depth must be controlled to meet bandwidth requirements for the device. The deep grating and smaller period of the reflector result in a smaller Bragg length. Since the reflector must also be longer than the Bragg length the fact that the Bragg length of the reflector can be minimized helps reduce the device size.

The semiconductor devices (MOSFET structures, diodes of FIGS. 5, 8,9) depend on precise control of the index of refraction and preferably the device should be housed in an environment where the temperature is strictly controlled in order to obtain the best performance. However, changing the device structure to make it less temperature sensitive is also contemplated by the present invention. For example, the use of a cover layer whose temperature dependence is opposite to that of the semiconductor material of the guide layer and the substrate would make the propagation constant of the guided wave temperature insensitive. The temperature effect may also be compensated for electronically by adjusting the bias voltage on the device automatically responsive to a temperature sensor to compensate for temperature induced index changes. A system combining all of the above techniques would produce the optimum result.

Although the invention has been shown and described with reference to preferred embodiments, nevertheless, changes and modifications will be obvious to those skilled in the art which do not depart from the spirit or teachings hereof. Such are deemed to fall within the scope and purview of the appended claims hereto.

I claim:

1. An optical device comprising
    a transparent layer means for receiving a normally incident coherent polarized beam of electromagnetic radiation having a preselected wavelength, and for supporting at least one resonant mode,
    grating means imposed on said layer means for establishing exclusively optical interaction with the layer means and having a grating period less than said preselected wavelength to establish first order coupling with the normally incident beam and
    the layer means and grating means interacting responsive to receiving the normally incident polarized beam to couple the layer means with the grating means exclusively providing the coupling of the beam into the layer means to produce a standing wave resonance by Bragg reflection in said layer means by second order coupling by the grating means.

2. The optical device of claim 1 further including termination means at each end of the grating means for producing reflection in the layer means.

3. The optical device of claim 1 further including a cover layer means over the grating means for covering the grating means.

4. The optical device of claim 1 wherein the layer means and grating means are composed of silicon.

5. The optical device of claim 1 further including a transparent conducting electrode on said grating means, a substrate supporting said layer means and a contact to said substrate.

6. The optical device of claim 5 wherein the grating means is an n+ contact region of silicon etched to form alternate bars and walls, the layer means is a lightly doped n type region of silicon, the substrate is a heavily doped p type region of silicon and said contact is a p+ region.

7. The optical device of claim 1 wherein said grating and layer means is a non-linear medium and is supported on a substrate.

8. The optical device of claim 1 wherein said layer means is composed of a photorefractive material.

9. The optical device of claim 1 wherein the layer means s an inversion layer supporting long range plasmons.

10. The optical device of claim 1 further including temperature compensating means coacting with the layer means and the grating means for compensating the variations in temperature.

11. An optical apparatus comprising means for producing a coherent polarized beam of electromagnetic radiation having a preselected wavelength,
    a transparent layer means for receiving normally incident thereto the polarized beam and for supporting at least one resonant mode,
    grating means imposed on said layer means for establishing exclusively optical interaction with the layer means and having a grating period less than said preselected wavelength, to establish first order coupling with the normally incident beam,
    the layer means and grating means interacting responsive to receiving the normally incident polarized beam to couple the layer means with the grating means with the grating means exclusively providing the coupling of the beam into the layer means to produce a standing wave resonance by Bragg reflection in the layer means by second order coupling by the grating means, and
    control means coacting with the layer means and the grating means for controlling the relative indices of refraction of the layer means and the grating means for obtaining a resonance wavelength in the layer means equal to the preselected radiation wavelength and thereby high reflectance to modulate the polarized beam.

12. The optical apparatus of claim 11 further including termination means at each end of the grating means for producing reflection in the layer means.

13. The optical apparatus of claim 11 wherein the layer means and grating means are composed of silicon.

14. The optical apparatus of claim 13 further including a substrate on which said layer means and grating means are supported.

15. The optical apparatus of claim 11 further including a transparent conducting electrode on said grating means, a substrate supporting said layer means and a contact to said substrate.

16. The optical apparatus of claim 11 wherein the layer means is an inversion layer supporting long range plasmons.

17. The optical apparatus of claim 11 further including temperature compensating means coacting with the layer means and the grating means for compensating the variations in temperature.

18. An optical apparatus according to claim 11 wherein said control means includes modulation means for modulating the layer means between two stable states, a first of which obtains a resonance condition in the layer means of equal wavelength to the preselected radiation wavelength and thereby high reflectance, and a second of which obtains a non-resonance condition in the second layer means relative to the predetermined radiation wavelength and thereby transparency for transmission of a modulated polarized beam.

19. An optical apparatus according to claim 11 further including a cover layer over the grating means and wherein said control means controls the interaction of the layer means and the grating means by modifying the index of refraction of one of said cover layer and said layer means for obtaining a resonance wavelength in said layer means equal to the preselected radiation wavelength and thereby high reflectance.

20. A spatial light modulator comprising an array of modulators onto which is directed a plurality of coherent polarized beams of electromagnetic radiation having a preselected wavelength, drive means connected to drive each modulator and photosensor means to sense light and responsive thereto to control said drive, each said modulator of said array comprising a transparent layer means for receiving at least one normally incident coherent polarized beam and for supporting at least one resonant mode and grating means associated with and imposed on said layer means of each said modulator for establishing exclusively optical interaction with the layer means and having a grating period less than said preselected wavelength, to establish first order coupling with the normally incident beam the layer means and associated grating means interacting to produce a standing wave resonance by Bragg reflection in the layer means by second order coupling by the grating means, and said drive means associated with each modulator controlling same to obtain in said layer means of each said modulator a resonance wavelength in the layer means equal to the preselected radiation wavelength and thereby high reflectance to modulate the at least one coherent polarized beam received thereby.

* * * * *